Jan. 18, 1955
C. L. MOURFIELD
2,699,703
PHOTOGRAPHIC REPRODUCTION APPARATUS
Filed Nov. 20, 1950
8 Sheets-Sheet 1
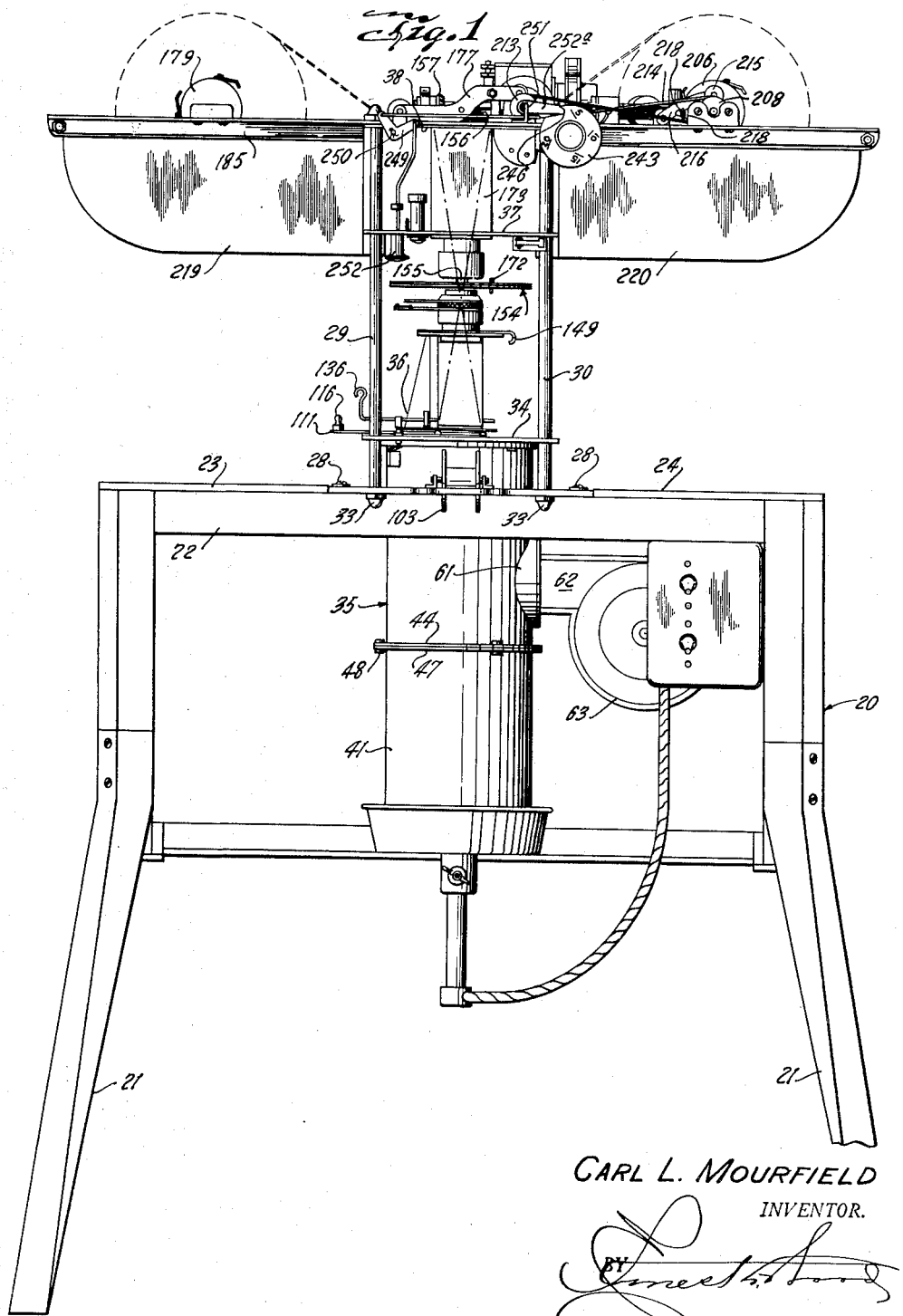
CARL L. MOURFIELD
INVENTOR.
ATTORNEY

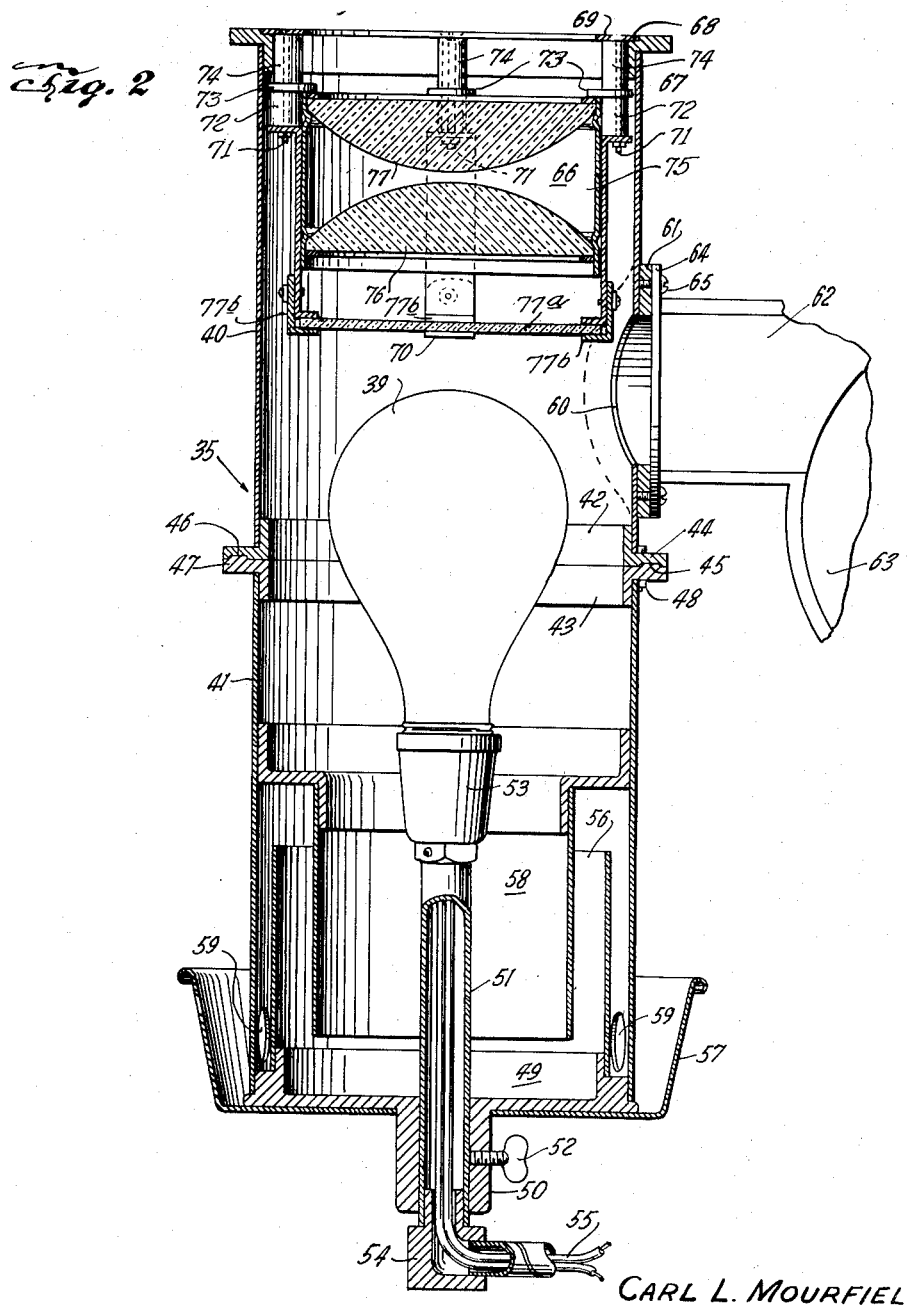

Jan. 18, 1955     C. L. MOURFIELD     2,699,703
PHOTOGRAPHIC REPRODUCTION APPARATUS
Filed Nov. 20, 1950     8 Sheets—Sheet 3
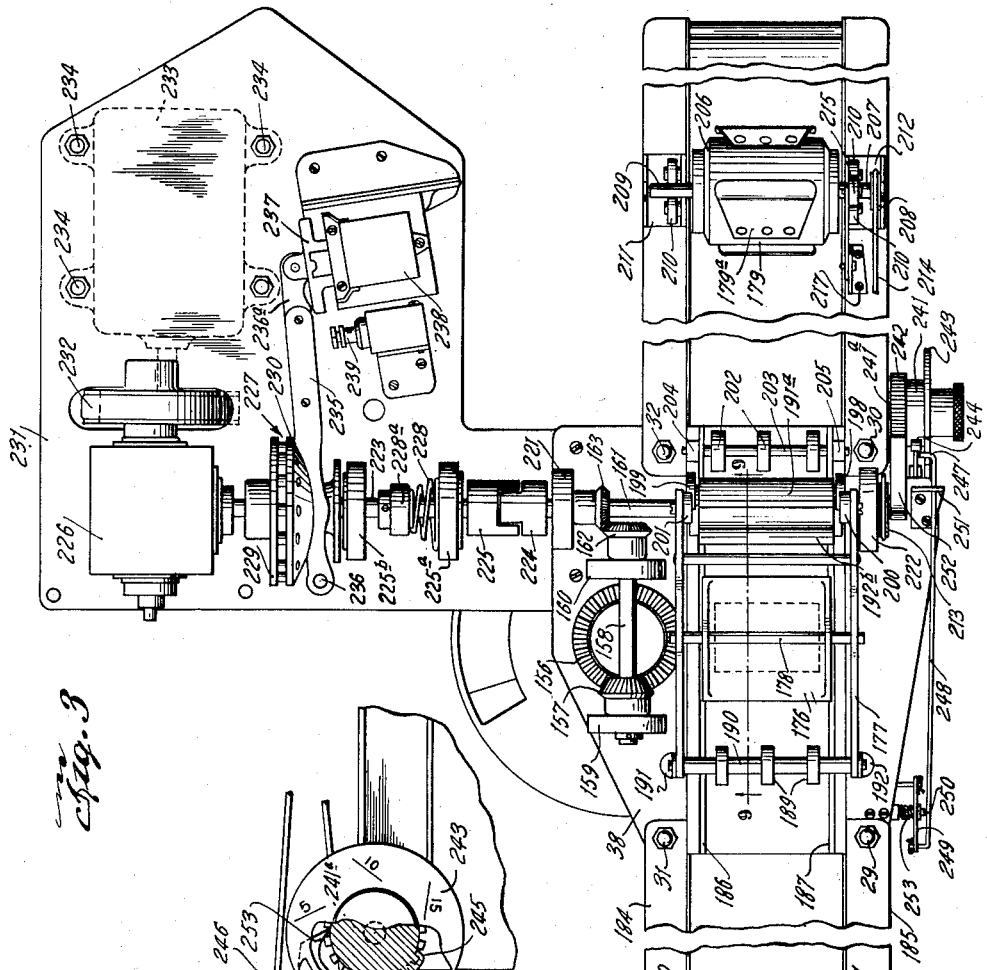
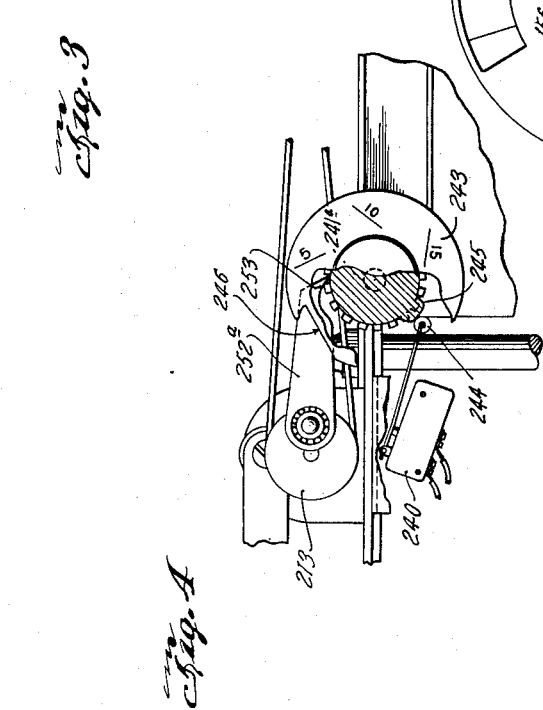
CARL L. MOURFIELD
INVENTOR.
ATTORNEY Jan. 18, 1955

C. L. MOURFIELD 2,699,703

PHOTOGRAPHIC REPRODUCTION APPARATUS

Filed Nov. 20, 1950

CARL L. MOURFIELD
INVENTOR.

BY

ATTORNEY

Jan. 18, 1955  C. L. MOURFIELD  2,699,703
PHOTOGRAPHIC REPRODUCTION APPARATUS
Filed Nov. 20, 1950  8 Sheets-Sheet 5
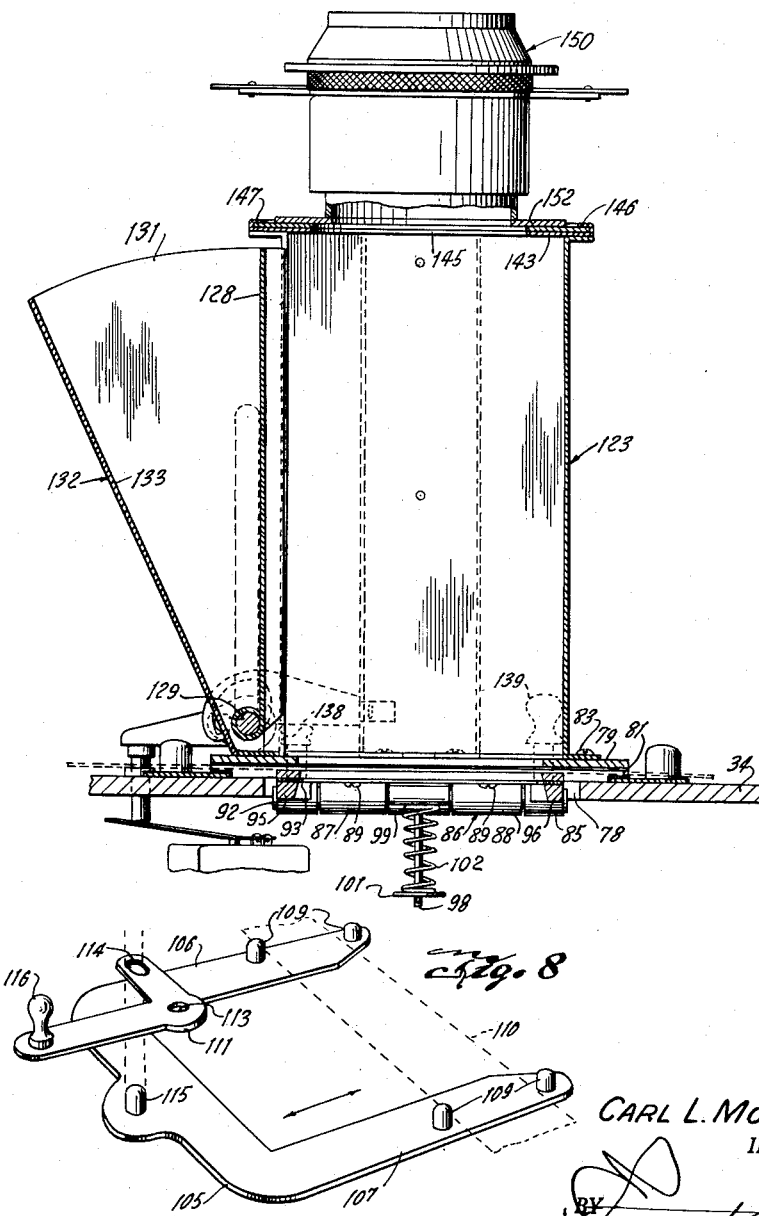
CARL L. MOURFIELD
INVENTOR.
ATTORNEY Jan. 18, 1955

C. L. MOURFIELD 2,699,703

PHOTOGRAPHIC REPRODUCTION APPARATUS

Filed Nov. 20, 1950

CARL L. MOURFIELD
INVENTOR.

BY

ATTORNEY

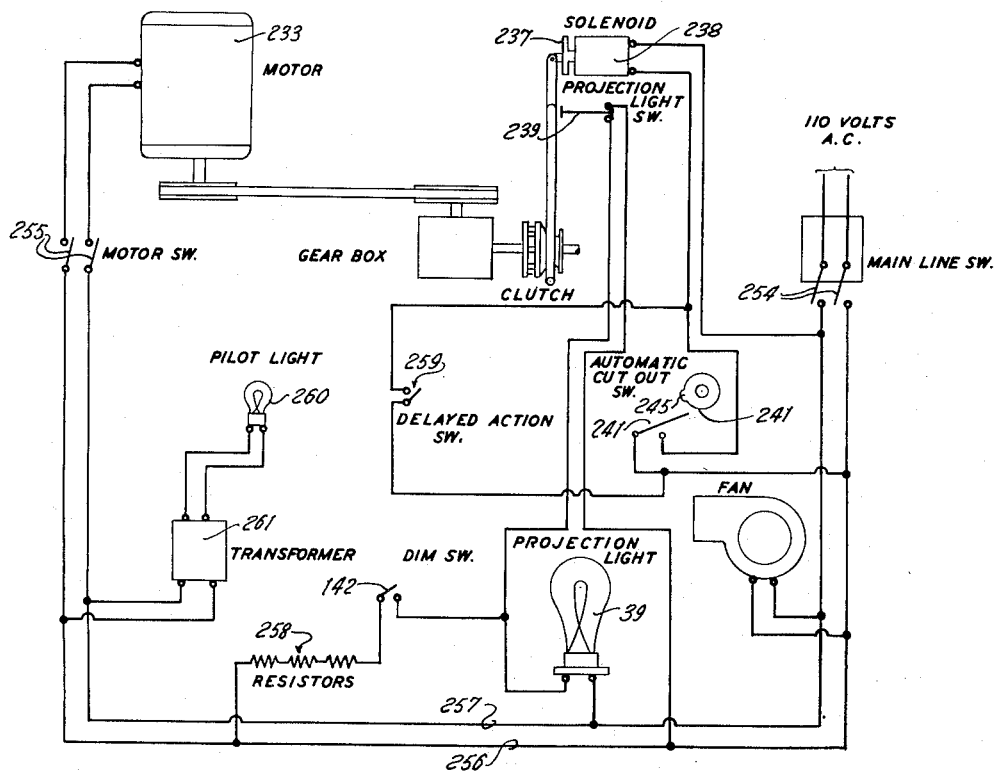

Jan. 18, 1955     C. L. MOURFIELD     2,699,703
PHOTOGRAPHIC REPRODUCTION APPARATUS
Filed Nov. 20, 1950     8 Sheets-Sheet 8
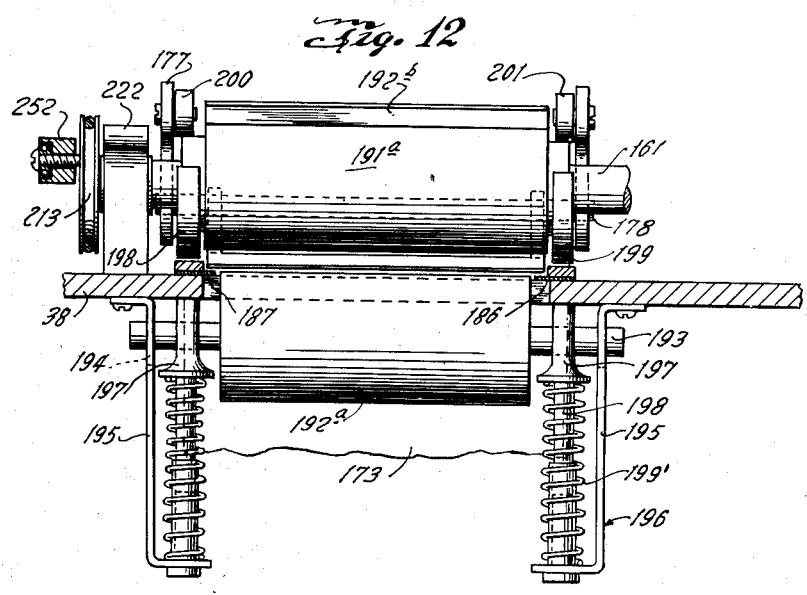
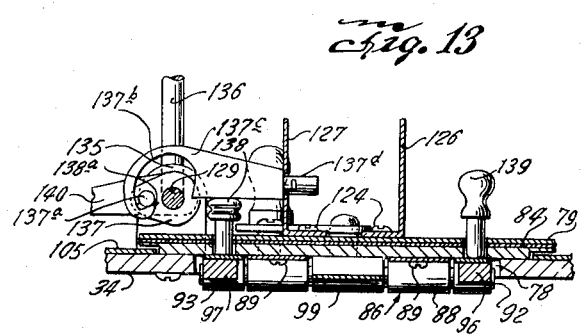
CARL L. MOURFIELD
INVENTOR.
BY
ATTORNEY

United States Patent Office 2,699,703
Patented Jan. 18, 1955

2,699,703

PHOTOGRAPHIC REPRODUCTION APPARATUS

Carl L. Mourfield, Dallas, Tex.

Application November 20, 1950, Serial No. 196,595

8 Claims. (Cl. 88—24)

This invention relates to photographic machines and more particularly to such machines for automatically producing a plurality of positive reproductions or prints from a negative.

In commercial quantity production of photographic prints, it is often desired to produce a predetermined number of enlarged prints from each of several negatives on a single strip of film. The photographic machine employed for this purpose must be capable of producing a large number of prints automatically and with a minimum of attention from the operator of the machine in order to lower the cost of production of the prints. To achieve this efficiency of operation, the image of the desired negative is usually projected a predetermined number of times on a strip of sensitized paper which is moved intermittently and in synchronism with the projection of the image so that the image is projected on successive spaced portions of the strip. The speed and efficiency of this paper feed mechanism is usually the critical factor in limiting the speed of operation of the machine. The machine must also be provided with a means for properly and quickly orienting the negative with respect to the strip of sensitized paper if the desired rate of production of prints is to be achieved.

Accordingly, it is one object of the invention to provide a new and improved photographic reproduction machine.

It is another object of the invention to provide a new and improved apparatus for automatically producing a plurality of enlarged prints from a single negative.

It is another object of the invention to provide a new and improved apparatus for automatically producing a predetermined number of enlarged prints from a single negative.

It is still another object of the invention to provide a new and improved apparatus for projecting an image of a negative on a strip of sensitized paper having a means for quickly and easily orienting the negative with respect to the strip of paper.

It is a further object of the invention to provide a new and improved mechanism for intermittently moving an elongated strip a predetermined distance.

It is a still further object of the invention to provide a new and improved feed mechanism for moving a strip a predetermined distance a predetermined number of times.

It is a still further object of the invention to provide a new and improved feed mechanism having a continuously rotating feed roller for intermittently advancing a strip a predetermined distance.

Briefly stated, the new and improved photographic reproduction apparatus comprises a light source and a paper feed mechanism for intermittently moving successive portions of a strip of sensitized paper past an aperture through which the light from the source is projected. A mechanism for holding and orienting negatives is interposed between the light source and the aperture so that an image of a negative may be projected on the strip of paper. A shutter device, synchronized with the paper feed mechanism, is disposed between the negative holding mechanism and the aperture past which the paper is advanced to permit the image of the negative to be projected on the paper only when the latter is stationary. Automatic controls are associated with the paper feed mechanism, the light source, and the negative holding and orienting device to insure that paper feed mechanism and the light source are energized solely during the times when the apparatus is in operation producing enlarged prints of the negatives. Further controls are provided to enable the apparatus to be set to produce automatically a predetermined number of the enlarged prints from a selected negative on a strip containing a plurality of negatives.

For a better understanding of the invention, reference may be had to the following description taken in connection with the accompanying drawing and its scope will be pointed out in the appended claims.

In the drawing,

Figure 1 is a side elevation of the photographic reproduction machine.

Figure 2 is a longitudinal sectional view of the light source housing.

Figure 3 is a top plan view of the device shown in Figure 1.

Figure 4 is a side view of the mechanism for predetermining the number of prints to be made, some parts of the mechanism being partly broken away.

Figure 7 is a view taken along line 7—7 of Figure 6.

Figure 8 is a perspective view of a portion of the mechanism shown in Figure 5.

Figure 11 is a diagrammatic illustration of the electric control circuit of the machine.

Figure 12 is a view taken on line 12—12 of Figure 9, and

Figure 13 is a detailed view of a portion of the flap actuating device.

Figure 5:
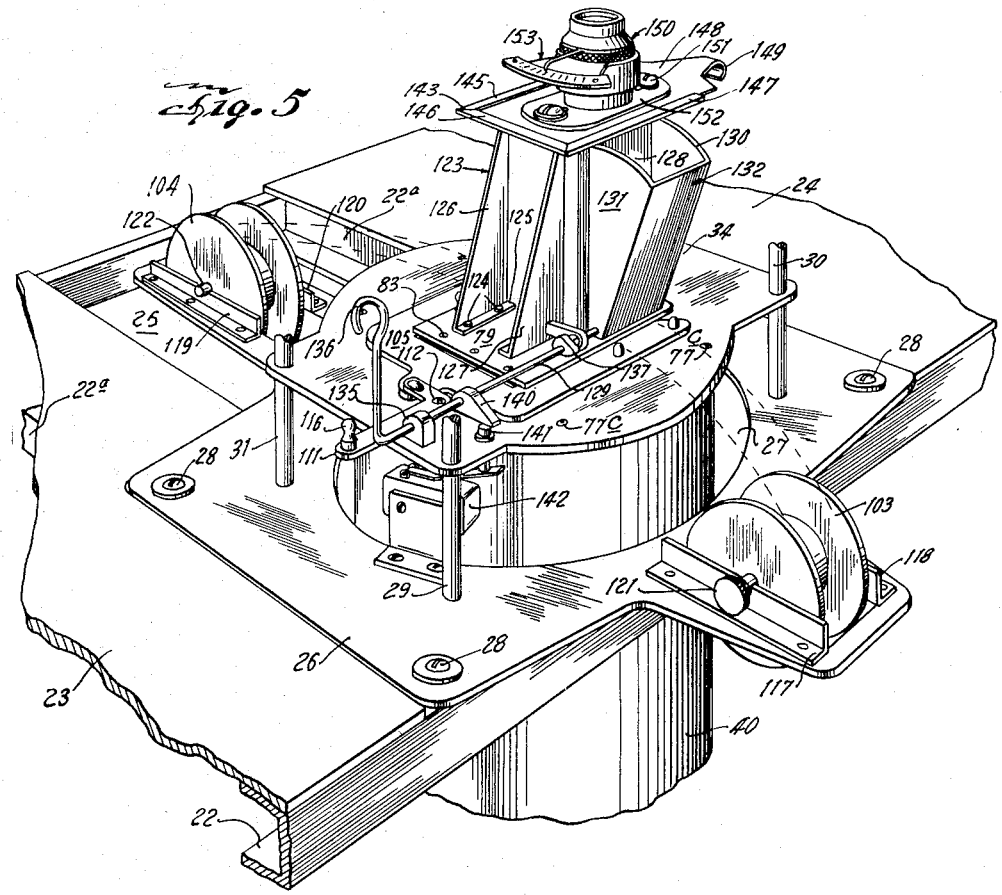
Figure 5 is a perspective view of the mechanism for holding and orienting the negatives.
Figure 6:
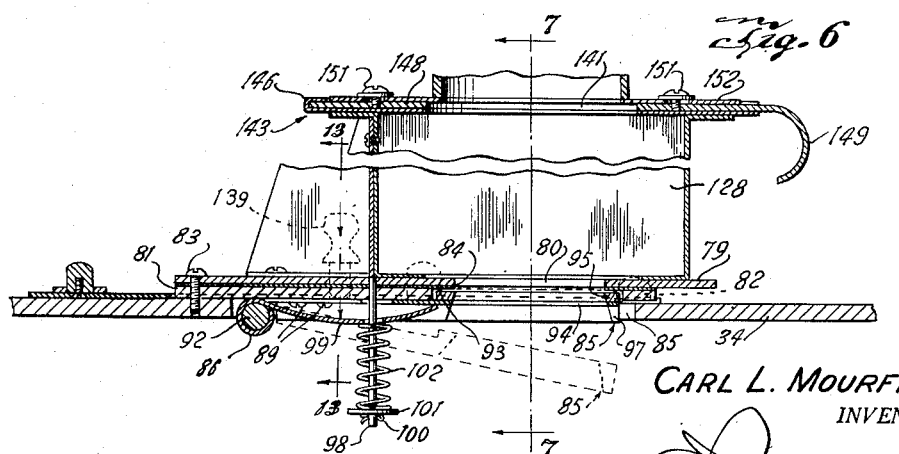
Figure 6 is a sectional view of a portion of the mechanism shown in Figure 5.

Referring now to the drawing, the photographic reproduction machine is mounted on a frame 20 having four legs 21 supporting a rectangular top frame 22 formed of channel shaped metal members and having a plurality of transverse members 22a. A pair of top plates 23 and 24 are secured to the frame 22 and are spaced from each other to provide an aperture 25. A supporting plate 26 having a circular aperture 27 is secured to the transverse members 22a by means of bolts 28 which extend through suitable registering apertures in the supporting plate and the transverse members. Four supporting rods 29, 30, 31 and 32 have their lower ends reduced and threaded to pass through suitable registering apertures in the supporting plate 26 and are rigidly secured to the plate by the cap nuts 33 which engage the lower threaded ends. Rigidly positioned on the supporting rods 29 to 32 by spacers or other conventional means is a lower plate 34 which supports the light source housing 35 and the film orienting mechanism 36, a middle plate 37, and an upper plate 38 which supports the paper feed mechanism and the shutter drive mechanism.

The light source, such as the lamp 39, is disposed in the housing 35 which is formed of two cylindrical portions 40 and 41 which are detachably secured to each other by a pair of abutting annular members 42 and 43. Annular member 42 is secured to the lower end of cylindrical member 40 while the annular member 43 is secured to the upper end of cylindrical member 41. The flange 44 of member 42 is provided with an annular groove 45 which receives an annular bead or projection 46 of the flange 47 of annular member 43. The bead and groove are provided to make the joint between the cylindrical members lightproof. The flanges 44 and 47 may be detachably secured to one another by bolts 48 which pass through suitable registering apertures in the flanges, or by any other suitable detachable connection.

The lower end of cylindrical member 41 is closed by an annular closure 49 having a central downwardly extending apertured extension 50 in which is mounted a conduit 51 held in place by a set screw 52 which extends through a threaded aperture in the extension 50 and bears against the conduit. The upper end of the conduit is provided with a light bulb socket 53 and the lower end receives an apertured block 54. A pair of conductors 55 pass through block 54 and conduit 51 to the socket 53.

The closure 49 also supports a cylindrical sleeve 56 and a pan shaped member 57. The sleeve 56 and member 57 cooperate with a depending sleeve 58 secured to cylindrical member 41 and with member 41 to form a light trap which prevents light from escaping through the ventilation apertures 59 in the lower end of member 41 into the room in which the machine is located. The various components of the light trap may be secured to each other by rivets or in any other conventional manner.

The upper cylindrical member 40 is provided with an aperture 60 to which is rigidly secured, by soldering or other conventional means, a cylindrical sleeve 61. The outlet 62 of a blower 63 is connected to sleeve 61 by means of the flange 64 on the outlet and the screws 65. The blower 63 forces air through housing 35 and the ventilation holes 54 to keep the temperature within the housing from rising to an unsafe level.

A conventional condenser assembly 66 is suspended from the top of cylindrical member 40 by means of an annular flange member 67 having an annular inner ledge 68 on which is supported a ring 69. The condenser assembly 66 is suspended by means of a group of circumferentially spaced, vertical straps 70, the upper end of each being turned at right angles and apertured to receive a bolt 71 which extends through a sleeve 72, a washer 73, another sleeve 74 and is affixed to the ring 69. The washer 73 is interposed between two spacer sleeves 72 and 74 and extends over and is attached to the inner annular flange surrounding the top of the housing 75 of the condenser assembly 66. The condenser assembly 66 comprises a pair of plano-convex lenses 76 and 77 which are held in desired position in the condenser housing 75 by annular rings and beads on the inner surfaces of the housing 75. A glass disc 77a is disposed below the lenses and is supported between the inwardly turned lower ends of the straps 70 and L-shaped clips 77b which are attached by screws to the straps adjacent their lower ends. The flange member 67 is provided with suitable apertures to receive bolts 77c (Fig. 5) which detachably secure the housing 35 to the plate 34.

The lower plate 34 is provided with a rectangular aperture 78. A cover plate 79 having a rectangular aperture 80 of smaller dimension than aperture 78 is supported in spaced relation to lower plate 70 by means of spacing strip 81. Strip 82 is employed to limit the movement of the film strip which may be slid beneath the strip 82. Strips 81 and 82 are secured to plate 79 by screw 83. A sheet 84 of metal having a smooth surface is disposed between cover plate 79 and strips 81 and 82 and extends to the edges of the aperture 78 in the cover plate to provide a surface against which may be held the film strip having the negatives. The film strip is held against the sheet 84 by an apertured flap 85 which is secured to strip 81 by a hinge 96. The fixed leaves 87 and 88 of the hinge are secured to strip 81 by screws 89 while the leaves 90 and 91, which are rotatable about the hinge pin 92, are secured to a metal plate 93 which has a rectangular aperture 94. A stripping 95 having a smooth upper surface is secured about the upper edges of the apertures 94. Reinforcing strips 96 and 97 are also secured to the metal plate 93 about its outer edges and may be recessed to extend about the aperture in flap 85. In order to bias the flap 85 toward the cover plate 79, a rod 98 is rigidly secured to the cover plate and extends downwardly through suitable apertures in strip 81, the flap plate 93 and the central movable leaf 99 whose outer ends abut the flap plate. The lower end of rod 98 is apertured to receive a cotter key 100 which supports a retaining washer 101. A coil spring 102 is mounted on rod 98 between the central leaf 99 and the retaining washer.

The film strip is unwound off one of the spools 103 or 104 onto the other and is passed between the sheet 84 and the stripping 95 of flap plate 93. The light projected from lamp 39 will therefore pass through the condenser assembly 66, and the apertures in the flap plate 93 and cover plate 79. If a negative is positioned between these plates and across their apertures, the image of the negative will be projected upwardly. In order to position the film strip properly with respect to the apertures in the flap plate and cover plate, a bracket 105 is slidably mounted on cover plate 79. The bracket has two arms 106 and 107 which lie in opposite ends of strips 81 and 82 and beneath the side edges of cover plate 79, the cover plate extending past the ends of the strips. Each arm of the bracket has two pins 109 between which the film strip 110 is passed as indicated in Figure 8. The bracket 105 is moved by a bell crank lever 111 which is pivotally mounted on the supporting plate 34 by a pin 112 which extends into the aperture 113 of the bracket. The lever 111 is also provided with an aperture 114, of substantially slot shape, which loosely engages the pin 115 of the bracket. It will be apparent that by pivotally moving the bell crank lever by its knob 116 and about the pin 112, the bracket 105 may be moved with relation to the cover plate 79.

The film spools 103 and 104 are rotatably mounted on the supporting plate 26 by means of L-shaped members 117 and 118 and 119 and 120, respectively. The L-shaped members are notched to receive the shafts 121 and 122 of the spools 103 and 104, respectively. Either or both of the shafts may be provided with a handle to facilitate turning of the spool.

In order that the negative of the picture to be reproduced may be easily aligned or oriented with respect to the aperture 80 of the cover plate 79, a viewing housing 123 is provided so that the operator may easily observe the alignment of the negative prior to the exposure of the sensitized paper. The viewing housing 123 is secured to cover plate 79 by screws 124 which extend through the flanges 125 of a pair of buttresses 126 and 127 which extend from the viewing housing. The viewing housing has an open side closed by a gate 128 which is rigidly secured to a shaft 129 journaled in the sides 130 and 131 of a light chute 132 which inclines outwardly and upwardly from the open side of the viewing housing 123 and has an open top. When the gate 128 is pivoted to a position adjacent the side 133 of the light chute, the operator may observe the negative in position over the aperture 80 of the cover plate 79.

The shaft 129 is also journaled in a pillow block 135 secured to the lower plate 34, and has a free end bent perpendicularly to its main portion to provide a handle 136. A block 137 rigidly secured to shaft 129 has a pin 137a which extends into the slot 137b of a block 137c which is pivotally attached to buttress 127 by a pin 137d. The block 137c is adapted to engage a push rod 138 which extends through a suitable aperture in the cover plate 79 and abuts the flap plate 93. The block 137c and push rod 138 depress the flap plate 93 slightly as the gate approaches its fully open position and the pin 137a bears against the jaw 138a of the block 137c to pivot the block downwardly. This slight movement of the flap plate 93 frees the film strip so that it can be moved to a limited degree by manipulation of the bell crank lever 111 or of one of the film spools 103 or 104. A second push rod 139, which is manipulated directly by the operator, is employed to depress the flap plate 93 to a maximum degree if a new film strip is to be inserted.

The shaft 129 is also provided with another cam 140 which is adapted to contact and depress a push rod 141 which actuates a switch 142 to close a circuit which energizes the lamp 39 to give only a dim light. Thus the negative is illuminated dimly whenever the gate 128 is opened so that the operator can observe the position or alignment of the negative.

The viewing housing 123 supports a slide receiving bracket 143 which has an aperture 144 and has three edges turned back on itself to form the flanges 145, 146 and 147. A slide 148, provided with a handle 149, is slidably disposed in the bracket 143 in the channels formed by the flanges. A conventional diaphragm and focusing lens assembly 150 is mounted on slide 148 by means of screws 151 which extend in loose fitting relation through suitable apertures in the plate 152 on which the diaphragm assembly is mounted. The loose fit between the screws and the plate 152 enables the diaphragm assembly to be easily adjusted to proper position with respect to other components of the apparatus. The diaphragm and focusing lens assembly 150 is provided with the usually graduated scale and pointer 153 to indicate the size of the diaphragm opening.

Located immediately above diaphragm assembly 150 is a circular rotating shutter 154 mounted on a shaft 155 journaled in the upper plate 38. The shaft 155 has secured to its upper end a bevel gear 156 which meshes with another bevel gear 157 mounted on a shaft 158 journaled in the pillow blocks 159 and 160 mounted on the upper plate. The shaft 158 is driven by the shaft 161 to which it is connected by the bevel gears 162 and 163. Shutter 154 is composed of two discs 164 and 165, each of which is provided with a pair of registerable arcuate slots. The amount of light transmitted by the shutter can be controlled by adjusting the degree of registration of the slots 166 and 170 of the discs 164 and 165, respectively. One of the discs is provided with a plurality of holes 171 arranged along the periphery of a circle concentric with the center of the discs so that a particular degree of registration of the slots 166 and 170 can be set and maintained by passing a pin 172 in one disc through a selected hole in the other disc. This control of the degree of registration is necessary to permit prints to be made from negatives of greatly varying densities.

The light passed or projected through shutter 155 passes through a light housing, generally indicated by 173, supported on the middle palte 37. The upper aperture 174, see Figure 9, registers with a rectangular aperture 175 in upper plate 38 in order that light passed through the negative may be projected on a sheet of sensitized paper positioned over the aperture 175. The paper is held in proper position over the aperture 175 by a pressure plate 176 pivotally mounted on a pair of levers 177 by means of a shaft 178.

The sensitized sheet or strip of paper is wound in a roll which is mounted on a roller 179 provided with a plurality of leaf springs 179a to hold the roll securely and resiliently on the roller 179. The roller is rotatably mounted in a pair of channel shaped members 180 and 181 by means of stub shafts 182 and 183 which lie in suitable notches in the channel members. The channel members 180 and 181 are secured to side members 184 and 185, respectively, mounted on posts 31 and 29, respectively, and upper plate 38. The upper plate 38 has rigidly secured to it a pair of L-shaped guide members 186 and 187 disposed on opposite ends of the aperture 175 and employed to guide the strip of sensitized paper, unwound off the roll mounted on roller 179, over the aperture 175. A plurality of rollers 189 are mounted on a shaft 190, journaled in brackets 191 and 192, between the roller 179 and aperture 175 to change the direction of travel of the sensitized paper to insure that it moves parallel to upper plate 38 between the guides 186 and 187.

Figure 9:
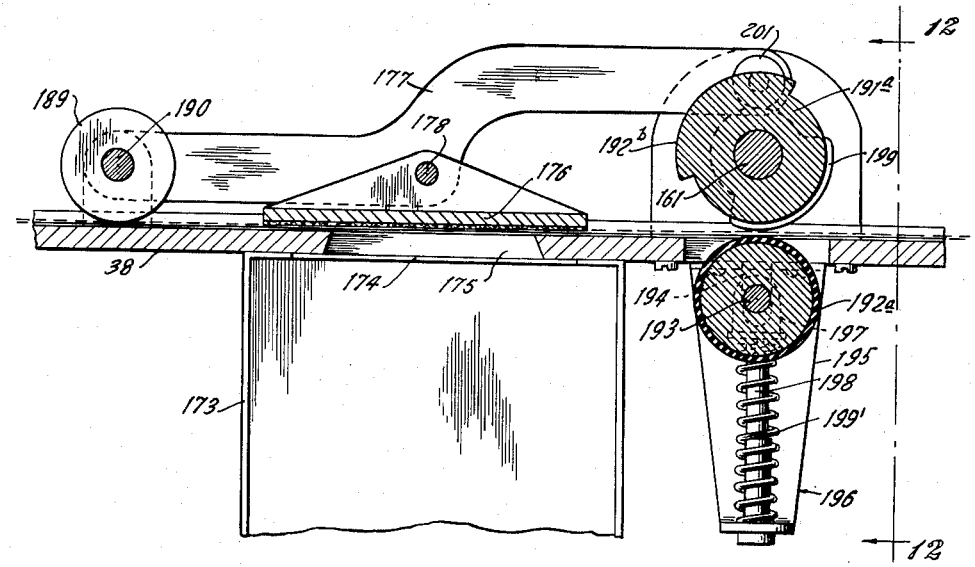
Figure 9 is a view taken along line 9—9 of Figure 3.
Figure 10:
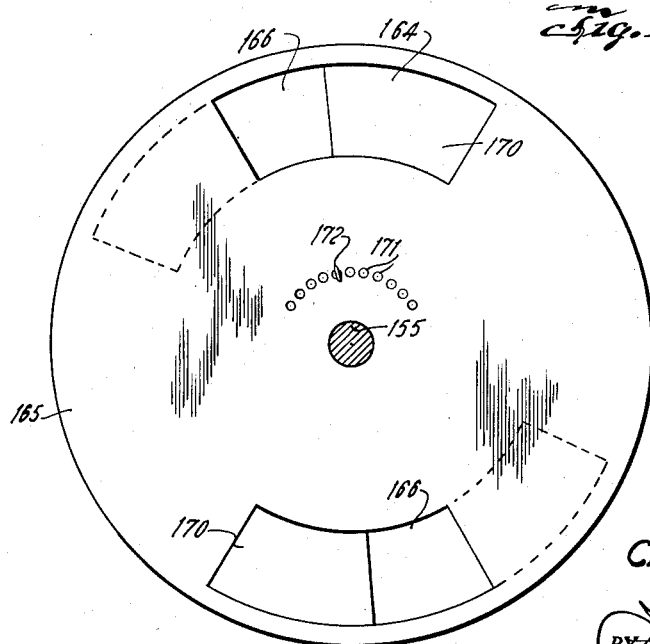
Figure 10 is a top plan view of the shutter.

The strip of paper is moved intermittently by a feed roller 191a which is rigidly mounted on the drive shaft 161 and which cooperates with a pressure roller 192a. The pressure roller is mounted on a shaft 193 extending through slots 194, only one of which is indicated in Figure 9, in the sides 195 of substantially L-shaped brackets 196. The shaft 193 is journaled in blocks 197 which are slidably mounted on rods 198 mounted on bracket 196. A pair of coil springs 199' biases the blocks 197 and, therefore the pressure roller 192a, upwardly toward feed roller 191a.

Feed roller 191a has a raised longitudinal portion 192b which extends over less than one-half the periphery of the feed roller. The feed roller and the pressure roller never come in contact but the distance between the raised portion 192b, when it is adjacent the pressure roller, and the surface of the pressure roller 192a is less than the thickness of the sensitized paper so that each time the raised portion 192b is revolved past pressure roller 192a, the sensitized paper is contacted by both the raised portion and the pressure roller. Sufficient pressure is exerted on the paper by the rollers to move the paper as the raised portion 192b revolves past the pressure roller. The paper will thus be moved only intermittently during the continuous rotation of feed roller 191.

A pair of cams 198 and 199 are also rigidly secured to shaft 161 on opposite ends of feed roller 191a and on the opposite side of shaft 161 from the raised portion 192b. The cams 198 and 199 cooperate with a pair of cam followers or rollers 200 and 201 mounted on the ends of levers 177. The opposite ends of the levers 177 are pivotally mounted on the shaft 190. The levers 177 will be pivoted upwardly by the cams during each revolution of shaft 161 to lift the pressure plate 176 off the sensitized paper lying over the aperture 175 of upper plate 38. Since the cams and the raised portion 192b of the feed roller are on opposite sides of the shaft 161, the pressure plate 176 will be raised whenever the raised portion is coacting with the pressure roller and contacting the paper to move it and will be lowered to hold the paper against the upper plate when the paper is not being moved by the feed roller. Thus the continuous rotating feed roller 191a moves the paper intermittently past aperture 175. The distance the paper is moved each time it is engaged by the raised portion depends on the radius of the roller and the width of the raised portion.

The paper, after passing between the feed and pressure rollers, travels beneath a plurality of rollers 202 mounted on a shaft 203 journaled in blocks 204 and 205 mounted on the guide members 186 and 187, respectively, and is wound into a roll on the roller 206, similar to roller 179 except that one of its stub shafts 207 is provided with a pulley 208. Each of the stub shafts 207 and 209 is mounted on a pair of rollers 210 mounted in channel members 211 and 212. The pulley 208 is connected to a pulley 213 mounted on shaft 161 by a belt 214. Belt 214 is preferably elastic and may be a spring. The roller 206 takes up the exposed paper moved toward it by the feed roller 191. When the paper is held fast by pressure plate 176 and the feed roller does not drive or feed the paper toward take-up roller 206, the roller 206 stops rotating even though the belt 214 is still being driven by pulley 213. The belt being elastic, it slips on the pulleys or stretches whenever the paper stops moving toward the take-up roller. The take-up roller 206 cannot pull the paper over the aperture even when the pressure plate 176 is in raised position since it cannot exert sufficient tension on the paper. The paper can be moved only by the feed roller.

The shaft 207 is maintained on rollers 210 by a roller 215 rotatably mounted on one end of a lever 216 whose other end is pivotally mounted on a bracket 217. The lever 216 is biased downwardly by a spring 218 secured to the lever and to the bracket 217. The roller 206 can be easily removed by pivoting lever 216 upwardly to disengage the roller 215 from the shaft 207.

The channel members 210 and 212 and the bracket 217 are mounted on a pair of side members similar to side members 184 and 185. Well housings 219 and 220 may be mounted on the side members to protect the sensitized paper on the rollers 179 and 206, respectively, from damage due to accidental contact and also from any light which may be reflected upwards toward the rollers.

The shaft 161 is journaled in pillow blocks 221 and 222 mounted on the upper plate 38. The shaft 161 is connected to a drive shaft 223 by a pair of loose coupling members 224 and 225. It will be observed that the drive shaft 223 may be moved with respect to shaft 161 since the members 224 and 225 may be moved apart and together without loosing connection between themselves. The driving shaft 223 is journaled in pillow blocks 225a and 225b and is connected to a speed changer 226 by a conventional friction clutch 227, the spring 228, which bears against pillow block 225a and the collar 228a rigidly secured to the driving shaft 223, normally maintaining the driving disc 229 in contact with the cork faced driven disc 230. The speed changer is mounted on a supporting plate 231 and is connected by a pulley belt 232 transmission to a motor 233 mounted on the underside of the supporting plate 231 by means of bolts 234.

The clutch 227 is controlled by a bifurcated clutch lever 235 having one end pivotally secured to supporting plate 231 at 236. A link 236a has one end rigidly secured to the clutch lever 235 and its other end pivotally secured to the plunger 237 of a solenoid 238 mounted on supporting plate 231. The solenoid when energized, moves clutch lever 235 about its pivot 236 against the resistance of spring 228 and disengages the driven disc 230 from the driving disc 229. The clutch lever 235 also contacts and opens a switch 239 whenever solenoid 238 is energized. The switch 239 controls the lamp 39.

Solenoid 238 is controlled by a switch 240 which is actuated by a cam 241 mounted on a common shaft 241a with a toothed wheel 242. Any conventional ratchet mechanism may be employed to mount the cam 241 and the graduated disc 243 on the common shaft for simultaneous counter-clockwise rotation of the cam 241 and disc 243 with the shaft 241a when the shaft 161 is rotated in a clockwise direction due to the ratchet mechanism. The shaft 161 will be stationary whenever the cam 241 is rotated to a position where the cam follower 244 contacts the raised portion 245 of the cam and closes switch 240 to energize the solenoid 238 and disengage the clutch 227.

In order to provide a means whereby the cam 241 can be moved to a position where the cam follower will not contact the raised portion 245, the disc 243 is cut away at 246 to receive the bent end 247 of the lever 248 whose opposite end is pivotally secured to one end of a bell crank lever 249 pivotally mounted as at 250 to the supporting plate 38. The lever 248 is supported in a bracket 251 mounted on plate 38. The other end of the bell crank lever 249 is pivotally secured to a handle 252 which passes through a suitable aperture in the middle plate 37. A spring 253 is employed to bias the bell crank lever to the position indicated in Figure 1. The handle 252 is pulled, therefore, the end 247 of the lever 248 engages in the cut away portion 246 of disc 243 and rotates the disc and the cam to a position where the follower no longer rides on the raised portion 245 of the cam. A tooth 252a has one end pivotally attached to the pulley 213 at an off center point on the pulley and the other pointed end 253 engages the teeth of the wheel 242. As the shaft 161 and pulley 213 rotate, the pointed end 253 engages a tooth and rotates the wheel one position in a clockwise direction. As the pulley 213 continues to rotate, the pointed end 253 slides back over the next tooth and upon further rotation of the pulley, engages the latter tooth to move the wheel again one position in a clockwise direction. The shaft 161 will continue to rotate and the wheel and the cam 241 are rotated step by step until the cam follower again is engaged by the raised portion 245 and closes the switch 240 to energize the solenoid 238.

The operation of the machine will now be described. A roll of sensitized paper is mounted on roller 179 and is passed under the rollers 189, between the guides 186 and 187 over the aperture 175 and beneath the pressure plate 176, beneath the rollers 202 and is secured to take-up roller 206. The film strip is mounted on the spools 103 and 104 and is passed over the aperture 78 of the cover plate 79 and between the pins 109 on the bracket 105. With the arm follower 244 positioned on the raised portion 245 of cam 241, and the main switch 254 and the motor switch 255 closed, the solenoid 238 is energized and the plunger 237 is pulled in so that the clutch is disengaged and the projection lamp switch 239 is opened. Shaft 161 therefore is at rest and the lamp 39 is not lighted. The film strip may now be oriented with respect to the apertures 78 and 175 by rotating the handle 136 of the shaft 129 to open gate 128, to move the flap 85 to a slightly open position so that the film strip is free to move with repect to aperture 78, and to close the switch 142 to connect the lamp 39 across the conductors 256 and 257 in series with the current limiting resistances 258. Due to resistances 258, the lamp 39 will be only dimly lighted when switch 142 is closed.

With the negative dimly illuminated by lamp 39, the operator can orient or frame the negative over the aperture 78 by moving the knob 116 of the bell crank lever 111 and rotating one or the other of the film strip spools 103 or 104. Once the negative is properly positioned with respect to aperture 78, its image will be properly projected with respect to aperture 175 since the apertures are aligned. The operator can observe the position of the negative during the orienting operation by looking down the light chute 132. It will be apparent that this method of orienting the negative offers many advantages over the usual method which comprises the projection of the image onto the easel on which the sensitized paper is later placed. The operator need observe only the lighted negative and does not have to mask the sensitized paper. During operation, the shutter 154 is so positioned that the dim light of lamp 39 does not reach the sensitized paper over aperture 175.

When the negative is properly disposed, the handle 136 is released and the biasing spring 102 closes the flap 85 and the gate 128. The disc 243 is normally set for the production of the maximum number of prints of the negative. The handle 252 is then pulled down to move the lever 248 toward the disc 243 so that its bent end 247 contacts the disc at its cutaway portion 246 and rotates the disc and the cam 241 in a clockwise direction a distance sufficient to allow the cam follower 244 to disengage from the raised portion 245 and open the switch 240. Solenoid 238 will be deenergized and the biasing spring 228 will cause the clutch to engage to set shaft 161 in rotation. At the same time switch 239 is allowed to close since the link 236 is pivoted away from the switch. With switch 239 closed, the lamp 39 is connected across conductors 39 and is fully energized to project a light of great intensity through the negative.

If a lesser number of prints than the maximum is required, the delayed action switch 259 is depressed and disc 243 is rotated clockwise until the desired number is indicated. Upon release of the delayed action switch 259, the machine will produce the desired number of prints. This is desirable in making test prints and identifying film strips by only a few prints.

The shaft 161 is directly geared to the shaft 155 of the shutter 154 and rotates the shutter so that the light projected through the negative is allowed to pass through the apertures in the shutter to fall upon the paper held over the aperture 175 of the upper plate 38 by the pressure plate 176. When the shutter 154 rotates to a position where it stops the light from falling upon the paper, the cams 198 and 199 on the shaft 161 which rotates continuously, engage the rollers 200 and 201 on the levers 177 to pivot the levers upwardly and raise the pressure plate 176 off the paper. When the pressure plate is lifted, continued rotation of shaft 161 causes the raised portion 192a of the feed roller 191 to contact the strip of paper. The paper is then held between the raised portion 192a and the pressure roller 192 and is moved as long as it is contacted by the raised portion. When shaft 161 rotates to a position where the raised portion no longer contacts the paper, the paper ceases to move and the cams 198 and 199 are rotated to a position in which the pressure plate 176 again rests upon the paper. The shutter 154 then has rotated to a position in which light again passes through the aperture in the shutter to fall upon the paper over aperture 175.

Each time the shaft 161 rotates one revolution, the tooth 252 engages a tooth of wheel 242 and rotates the wheel and cam 241 a predetermined distance. This sequence of operations repeats until the wheel 242 and the cam 241 are rotated to a position in which the raised portion 245 of the cam contacts the follower 244 to close the switch 240. With switch 240 closed, the solenoid 238 is again energized to disengage the clutch 227 and open the switch 239. The strip of film can then be moved to position another negative over the aperture 78 and a new sequence of images can be projected on the sensitized paper.

A normally open switch 259 is connected across switch 240 so that the solenoid 238 may be energized at any time to delay or stop the operation of the apparatus. A pilot light 260 generally casting a red light, may be energized through a step down transformer 261 to cast a sufficient amount of light to permit the operator to locate the controls of the machine. The fan is connected directly across conductors 256 and 257 and operates as long as switch 254 is closed.

Due to the ease of orientation of the negative, the automatic operation of the machine to produce desired predetermined number of prints of a negative, and the high speed at which the paper can be moved by the continuously rotating feed roller, one operator employing two machines can make as many as eight thousand prints an hour. The operator orients the negative in one machine while the other is running, and vice versa, so that the operator does not stand by idly while a series of exposures are made by one machine.

While a preferred embodiment of the invention has been illustrated and described, it will be apparent that various changes and modifications can be made without departing from the invention and it is intended in the appended claims to cover all such changes and modifications as fall within the true spirit and scope of this invention.

What is claimed is:

1. In a photographic reproduction machine: a light source; a retaining and orienting device for negatives disposed above said light source; a housing above said device having an open side; a gate for closing said side, said gate when open permitting observation of the position of a negative held by said device; a pivotally mounted flap gate for holding negatives immovable in said orienting and retaining device; and means operatively associated with said gate and said flap gate for freeing the negative for movement each time said gate is opened by pivoting said flap gate away from the negative each time said gate is opened.

2. In combination with the device of claim 1, and a switch actuated by said gate when said gate is moved to open position to connect a resistance across said light source to decrease the intensity of light admitted by said light source each time said gate is opened.

3. In a photographic reproduction machine: a plate having an aperture; a main shaft mounted at one end of said plate for rotation about a longitudinal axis; feed means driven by said main shaft for intermittently advancing a strip of paper past said aperture; a lever pivotally mounted at one end for movement relative to said plate; a pressure plate mounted on said lever; a cam on said main shaft, said lever cooperating with said cam to raise said pressure plate intermittently, said pressure plate overlying said aperture and pressing said strip of paper over said aperture when said strip is not being advanced by said feed means.

4. In combination with the device of claim 3, a rotatable disc having an off-center opening disposed on the side of said plate opposite said pressure plate, said opening being in alignment with said aperture during a portion of each rotation of said disc, and means connecting said disc to said main shaft for imparting rotary movement to said disc when said main shaft is rotated, the rotary movement of said disc being synchronized with said feed means and said main shaft to place said opening in alignment with said aperture when said strip of paper is not being advanced by said feed means and said pressure plate is overlying said aperture and pressing said strip of paper over said aperture.

5. In a photographic reproduction machine: a light source; a first plate provided with an aperture disposed above said light source; a cover plate disposed over and spaced from said first plate having an aperture in registry with said plate aperture but of smaller dimensions than said first plate whereby a negative may be positioned between said first plate and said cover plate; a flap gate pivotally connected to said first plate and movable into said plate aperture to hold a negative against said cover plate, said flap gate having an aperture whereby light from said light source may pass upwardly through said apertures and through a negative held between said cover plate and said flap gate, means yieldingly biasing said flap gate toward said cover plate, a housing above said cover plate; a gate for closing said side, said gate when open permitting observation of the position of a negative disposed beneath said cover plate; and means operatively associated with said gate for moving said flap gate away from said cover plate to free said negative for movement each time said gate is opened.

6. The device of claim 5, and a switch actuated by said gate when said gate is moved to open position and operatively associated with said light source for dimly illuminating said negative when said gate is opened.

7. In a photographic reproduction machine: a plate having an aperture; a main shaft mounted at one end of said plate for rotation about a longitudinal axis; a feed roller rigidly secured to said main shaft and having a raised portion extending parallel to said longitudinal axis; a pressure roller yieldingly biased toward said feed roller, said raised portion and said pressure roller cooperating to advance a strip of paper positioned between said rollers when said feed roller is rotated to move said raised portion past and in proximity to said pressure roller; a lever pivotally mounted at one end for movement relative to said plate; a pressure plate mounted on said lever; a cam on said main shaft, said lever cooperating with said cam to raise said pressure plate when said raised portion cooperates with said pressure roller to advance said strip of paper, a rotatable disc having an off-center opening disposed on the side of said plate opposite said pressure plate, said opening being in alignment with the aperture of said plate during a portion of each rotation of said disc; and means connecting said main shaft to said disc for imparting rotary movement to said disc when said main shaft is rotated, the rotary movement of said disc being synchronized with the rotation of said feed roller to place said opening in alignment with said aperture when said strip of paper is not being advanced by said raised portion and said pressure plate is overlying said aperture and pressing said strip of paper over said aperture.

8. In combination with the device of claim 7, driving means for rotating said shaft; and means operatively associated with said main shaft and said driving means for selectively predetermining the number of times said main shaft is to be rotated.

References Cited in the file of this patent

UNITED STATES PATENTS

| Number | Name | Date |
|---|---|---|
| 590,766 | Morand | Sept. 28, 1897 |
| 1,070,400 | Brieloff | Aug. 19, 1913 |
| 1,676,600 | Capstaff | July 10, 1928 |
| 1,704,794 | Fritts | Mar. 12, 1929 |
| 1,733,234 | Nistri | Oct. 29, 1929 |
| 1,835,457 | Briechle | Dec. 8, 1931 |
| 2,001,598 | Caps | May 14, 1935 |
| 2,011,353 | Capstaff | Aug. 13, 1935 |
| 2,082,232 | Traenkle | June 1, 1937 |
| 2,256,397 | Luboshez | Sept. 16, 1941 |
| 2,355,779 | Burleigh | Aug. 15, 1944 |
| 2,388,837 | Dye | Nov. 13, 1945 |
| 2,478,349 | Fritts | Aug. 9, 1949 |
| 2,517,250 | Shea | Aug. 1, 1950 |
| 2,557,182 | Forgett | June 19, 1951 |
| 2,557,685 | Rabinowitz | June 19, 1951 |